United States Patent [19]

Okura et al.

[11] Patent Number: 4,830,098

[45] Date of Patent: May 16, 1989

[54] AIR CONDITIONER SYSTEM FOR AUTOMOBILES

[75] Inventors: Eiji Okura; Ichizo Tomita; Hiroyuki Ida, all of Konan, Japan

[73] Assignee: Diesel Kiki Co., Ltd., Saitama, Japan

[21] Appl. No.: 167,151

[22] Filed: Mar. 16, 1988

Related U.S. Application Data

[62] Division of Ser. No. 21,543, Feb. 27, 1987, Pat. No. 4,749,028, which is a division of Ser. No. 768,234, Aug. 22, 1985, abandoned.

[30] Foreign Application Priority Data

Aug. 27, 1984 [JP] Japan ................... 59-177839

[51] Int. Cl.⁴ .................... B60H 3/00; B61D 27/00; F02G 5/00; F02M 13/02
[52] U.S. Cl. ........................... 165/42; 165/43; 237/12.3 C
[58] Field of Search ............ 165/42, 43; 237/12.3 C, 237/12.3 R, 12.3 A

[56] References Cited

U.S. PATENT DOCUMENTS

| | | | |
|---|---|---|---|
| 2,364,457 | 12/1944 | McCollum | 237/12.3 C |
| 3,763,927 | 10/1973 | Stafford et al. | 165/42 |
| 3,942,719 | 3/1976 | Blomberg | 237/12.3 C |
| 4,147,205 | 4/1979 | Bata et al. | 165/43 |
| 4,625,911 | 12/1986 | Tomita | 237/12.3 C |

Primary Examiner—Albert W. Davis, Jr.
Assistant Examiner—John K. Ford
Attorney, Agent, or Firm—Wenderoth, Lind & Ponack

[57] ABSTRACT

An air conditioner system for automotive vehicles has an evaporator disposed in a duct and selectively operative to cool air flowing through the duct, and a combustion heater disposed outside the duct and held in air flow communication with the latter for heating air drawn into the duct. The air conditioner system thus constructed can be applied to a vehicle having a non-water-cooled engine and is effective to cause a sudden increase in the temperature of air to be supplied to the vehicle passenger compartment.

1 Claim, 3 Drawing Sheets

AIR CONDITIONER SYSTEM FOR AUTOMOBILES

This application is a divisional of Ser. No. 021,543 filed Feb. 27, 1987 and now U.S. Pat. No. 4,749,028, which is a division of Ser. No. 06/768,234, now abandoned.

BACKGROUND OF THE INVENTION

1. Field of the Invention

The present invention relates to air conditioner systems for automotive vehicles, and more particularly to an air conditioner system including a combustion heater.

2. Description of the Prior Art

Various automobile air conditioner systems are known in which a cooler and a heater are disposed in an air flow duct and air is forced by a blower to flow through the cooler and heater such that the temperature of air introduced into a vehicle passenger compartment is controlled to be maintained at a desired value. The heater comprises a heater core in which the air is subjected to a heat-exchange relationship with engine cooling water which is circulating through the heater core to give up heat to the air.

Such a known air conditioner system however is not applicable to a vehicle having a non-water-cooled engine, such as an air-cooled engine. Another drawback is in that due to a relatively large specific heat of the engine cooling water, the known system needs a considerably longer period of time to obtain hot air when the engine is started cold.

SUMMARY OF THE INVENTION

It is therefore an object of the present invention to provide an air conditioner system for an automotive vehicle which can be used with a non-water-cooled type of engine and which is capable of obtaining hot air substantially at the same time or soon after the air conditioner system is started.

According to the present invention, the foregoing and other objects can be attained by providing an air conditioner system for an automotive vehicle including a passenger compartment and an engine with intake and exhaust manifolds mounted thereon, said air conditioner system comprising: a duct having an end open to the passenger comparment; a blower disposed in said duct for forcing air through said duct and into the passenger compartment; an evaporator disposed in said duct and selectively operative to cool air flowing therethrough; and a combustion heater disposed outside said duct and held in air flow communication with the latter for heating air drawn into said duct.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

The present invention will now be described in greater detail with reference to the illustrated embodiments.

Figure 1:
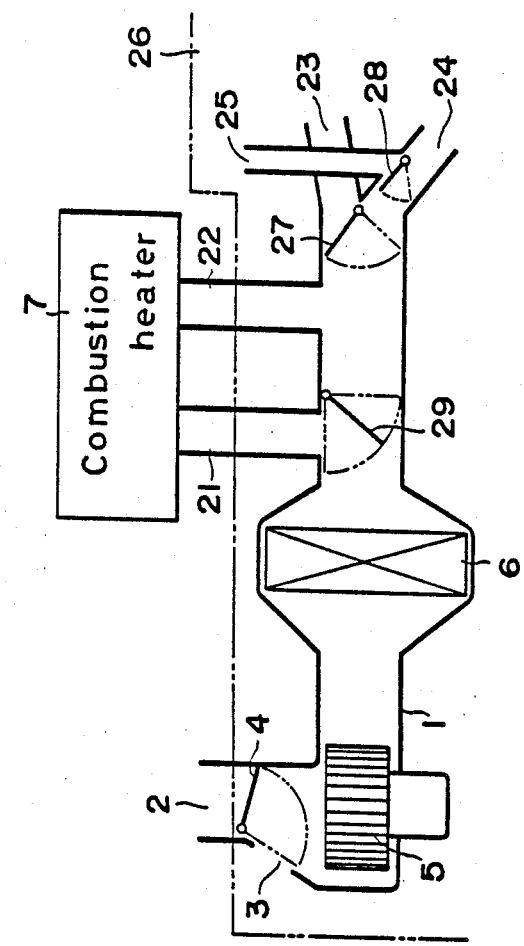
FIG. 1 is a schematic view of an automobile air conditioner system according to the present invention.

FIG. 1 shows a first embodiment of an air conditioner system according to the present invention. The air conditioner system comprises an air flow duct 1 having an outside air inlet 2 and a recirculated air inlet 3 that are provided in a branched fashion. A door 4 is disposed in the duct adjacent to the inlets 2, 3 to select one of the inlets 2 and 3.

A blower 5 is disposed in the duct immediately downstream of the inlets 2, 3 to cause air to be drawn from a selected one of the inlets 2, 3 into the duct 1 and then to flow downstream through the duct 1. An evaporator 6 is disposed in the duct 1 downstream of the blower 5 for cooling air flowing therethrough through the heat exchange between the air and a coolant. The evaporator 6 constitutes a part of a refrigerant system including a compressor, a condenser, a liquid tank and an expansion valve (none of which are shown). The refrigerant system is selectively operated as need arises, for example during summer.

A combustion heater 7 is disposed outside the duct 1 and, as described below, it is comprised of a combustion device for burning a fuel and a heat exchanger for taking out combustion heat created at the combustion device. The combustion heater, more particularly the heat exchanger, is held in air flow communication with the duct 1 by means of an intake passage 21 through which air flows from the duct 1 into the heat exchanger, and a return passage 22 through which heated air flows back to the duct 1. The intake passage 21 is open to the duct 1 immediately downstream of the evaporator 6 and the return passage 22 is open to the duct 1 downstream of the intake passage 21. With this construction, while the combustion heater 7 is in operation, the air is drawn into the duct 1, then passes through the evaporator 7, thereafter flows through the intake passage 21 into the heat exchanger where it receives heat, and finally flows into the duct 1 through the return passage 22.

A temperature control door 29 is disposed in the duct 11 at the junction between the duct 1 and the intake passage 21. The door 29 is positionally adjustable to control the amount of air to be introduced into the heat exchanger of the combustion heater 7 and thereby control the temperature of the air passing through the duct 1. The temperature control door 29 is driven by a suitable actuator (not shown).

The temperature controlled air is finally discharged into a vehicle passenger compartment 26 through an upper air outlet 23, a lower air outlet 24 and a defroster outlet 25. A mode control door 27 is disposed at the junction between the upper and lower air outlets 23, 24 to select one of these outlets 23, 24. Likewise, a mode control door 28 selects the lower air outlet 24 or the defroster outlet 25. The duct 1 constitutes a main part of the air conditioner system and is disposed in the passenger compartment 26 whereas the combustion heater 7 is disposed outside the passenger compartment 26.

The air conditioner system thus constructed operates as follows: When the air conditioner system is started, the blower 5 is driven to draw air from either inlet 2 or 3 into the duct 1. The introduced air is then cooled as it passes through the evaporator 6. Depending on the angular position of the temperature control door 29, a controlled amount of cooled air is introduced into the heat exchanger of the combustion heater 7 where it is heated. The heated air then flows back into the duct 1 and is mixed with the remainder of the cooled air so that the temperature of air which is thereafter supplied to the passenger compartment 26 is controlled at a desired value.

The air conditioner system according to the invention has various advantages: since the combustion heater 7 does not utilize engine cooling water, the air conditioner system is applicable to a vehicle having a non-water-cooled engine, such as an air-cooled engine. The combustion heater 7 can immediately supply hot air to the passenger compartment 26 even when the engine is started cold. The air conditioner system has no heater core disposed in the duct 1 and the combustion heater 7 is disposed outside the duct 1 and the passenger compartment 26 so that the main portion of the air conditioner system, namely the duct 1 can be reduced in size, occupying a relatively small space in the passenger compartment 26. Furthermore, the combustion heater 7 is smaller in size but more efficient than the conventional heater which consists of the heater core, compressor, condenser, etc. This feature meets with a recent demand for a heat source having compactness which has resulted in improvements in diesel engines, such as direct fuel injection and increased efficiency.

Figure 2:
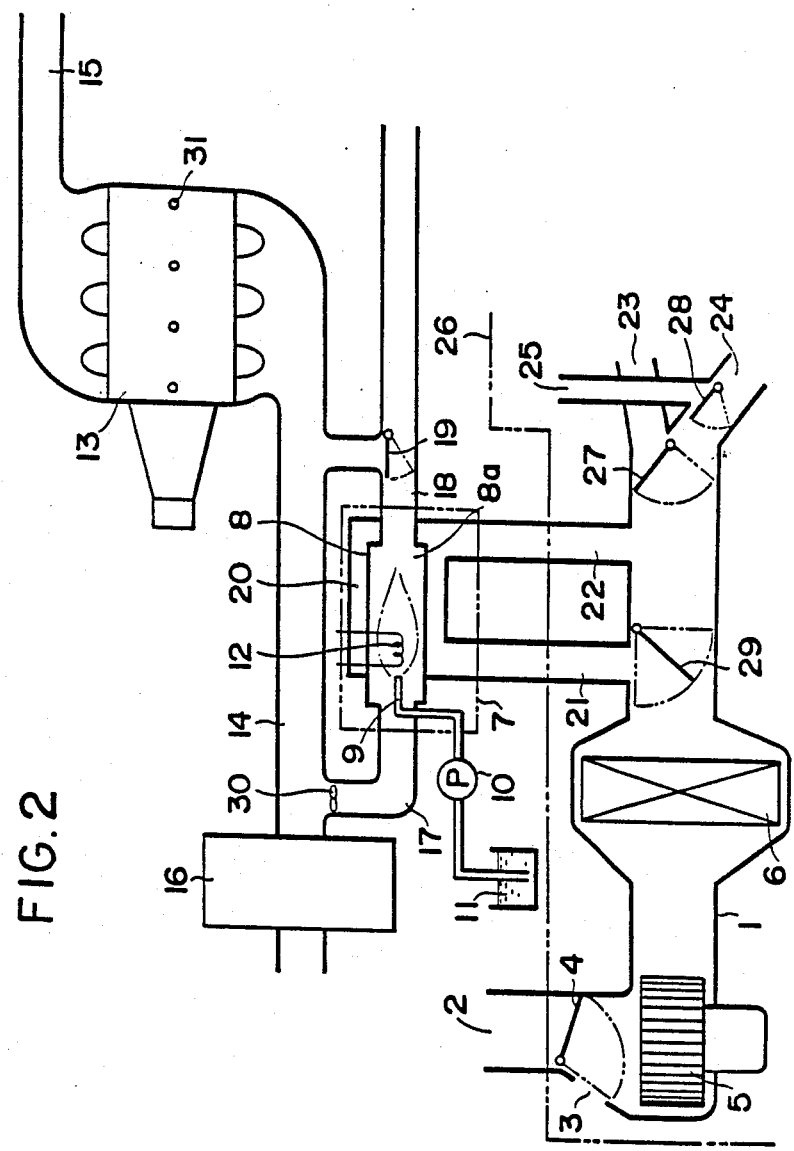
FIG. 2 is a schematic view showing the air conditioner system of FIG. 1 as applied to an automotive vehicle driven by a diesel engine.

FIG. 2 shows the foregoing air conditioner system as applied to a vehicle driven by a diesel engine 13. The diesel engine 13 includes an intake manifold 14, an exhaust manifold 15 and an air cleaner 16 connected to an inlet of the intake manifold 14. Air is drawn through the air cleaner 16 and the intake manifold 14 into individual cylinders in the engine 13 and is compressed to a high degree. As a result of this high compression, the air is heated to a prevailing high temperature. Fuel is then injected from injection nozzles 31 into the respective cylinders. Because of the prevailing high temperature, the fuel ignites spontaneously and combustion takes place. The thermal engergy which is released when the fuel is burned is converted into mechanical engergy via pistons and a crankshaft of the engine 13.

The combustion heater 7 comprises a combustion device 8 including a burner nozzle 9 disposed in a combustion chamber 8a, and an ignition device 12, such as a spark plug or a glow plug disposed adjacent to the burner nozzle 9 for igniting a fuel which is sucked from a fuel tank 11 and is supplied under pressure to the burner nozzle 9 by means of a pump 10. Thus, upon ignition, the fuel burns in the combustion chamber 8a.

The combustion chamber 8a is connected in parallel to the intake manifold 14 by an intake passage 17 and an exhaust passage 18. The intake passage 17 is open to the intake manifold 14 downstream of the air cleaner 16 and the exhaust passage 18 is open to the intake manifold 14 downstream of the intake passage 17. Thus, the passages 17, 18 jointly constitute a bypass passage with respect to the intake manifold 14. A blower 30 is disposed in the intake passage 17 at the junction between the intake manifold 14 and the intake passage 17 for drawing filtrated air into the combustion chamber 8a. The exhaust passage 18 has a branch passage (not designated) leading to the atmospheric air. A mode control door 19 is disposed in the exhaust passage 18 at the junction between the exhaust passage 18 and the branch passage to select one of these passages. The hot combustion gas is discharged to the outside air through the branch passage when the control door 19 is in the position illustrated by the solid line. When the control door 19 is in the position shown by the phantom line, the hot combustion gas is discharged into the intake manifold 14 through the exhaust passage 18. Such hot combustion gas warms the engine 13 and thereby improves the starting engine performance.

The combustion heater 7 also includes a heat exchanger 20 disposed around the combustion device 8 in such a manner as to surround the combustion chamber 8a. The intake passage 21 and the return passage 22 are connected at the opposite ends of the heat exchanger 20. With this construction, the air, which is introduced from the duct 1 through the intake passage 21 into the heat exchanger 20, receives heat from the hot combustion gas as it flows along the combustion chamber 8a. The heated air then is recirculated into the duct 1 through the return passage 22. The heated air is mixed up with the cooled air from the evaporator 6 so that the temperature of air to be supplied to the passenger compartment 26 is controlled at a desired value.

Figure 3:
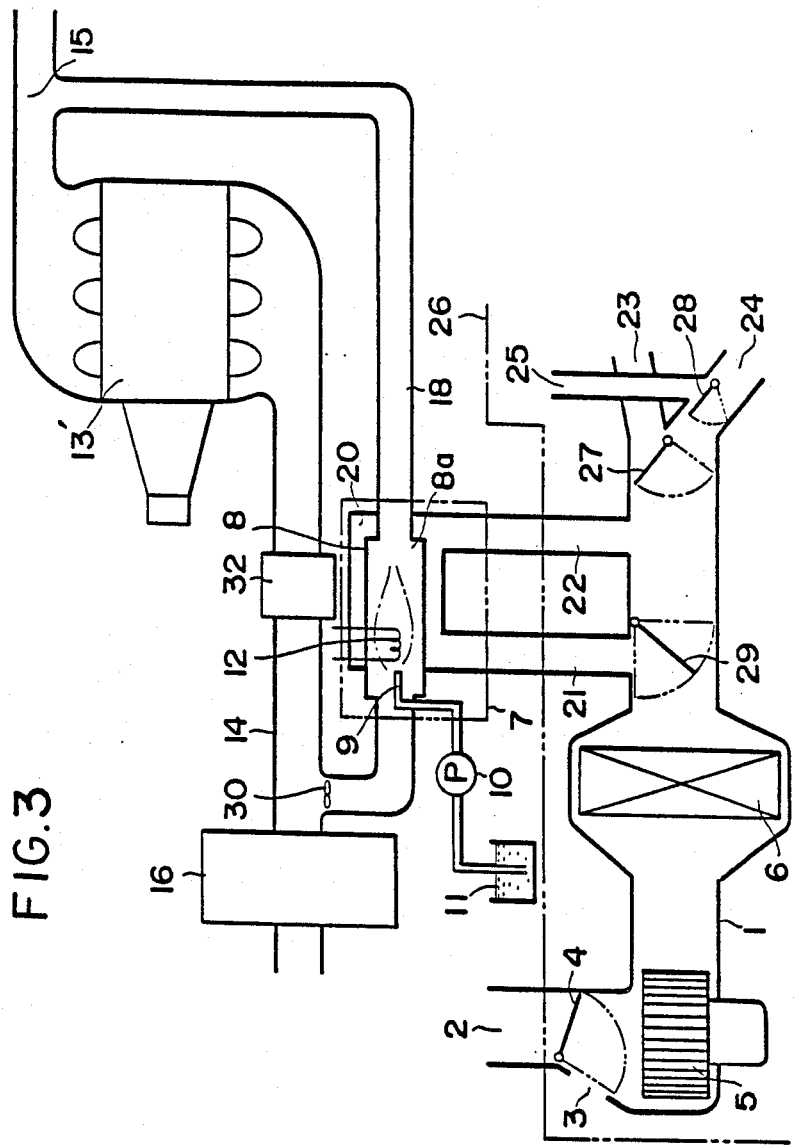
FIG. 3 is a view similar to FIG. 2, showing the air conditioner system as applied to an automobile having a gasoline engine.

The air conditioner system of this invention is applicable to a vehicle having a gasoline engine 13' as shown in FIG. 3 wherein like parts are designated by the same reference numerals. The illustrated system is substantially the same as the system shown in FIG. 2 with the exception that the combustion heater 7 has an exhaust passage 18 connected to an exhaust manifold 15 of the gasoline engine 13' for discharging the hot combustion gas outside the vehicle. Although not shown, the exhaust passage 18 may have a branch passage arranged to warm the engine 13' or a battery, thereby improving the engine starting performance. In such an instance, a door is provided at the junction between the branch passage and the exhaust passage 18. Reference numeral 32 designates a carburetor or fuel injection device.

Obviously, many modifications and variations of the present invention are possible in light of the above teachings. It is therefore to be understood that within the scope of the appended claims, the invention may be practiced otherewise than as specifically described.

What is claimed is:

1. An air conditioner system for an automotive vehicle including a passenger compartment and an engine having intake and exhaust manifolds mounted thereon, said air conditioner system comprising:

a duct extending in said passenger compartment, said duct having an opening that is open to the passenger compartment;

a blower means disposed in said duct for forcing air through said duct and to the opening thereof;

an evaporator disposed in the passenger compartment in said duct and selectively operative to cool air flowing through the duct;

a combustion heater disposed outside of both the passenger compartment and said duct and operatively connected to the duct in an air flow communicating manner for heating the air flowing through the duct to the opening thereof, said combustion heater including a heat exchanger having an intake passage connected to the duct and through which the cool air flowing through the duct in the passenger compartment passes and a return passage connected to the duct and through which air passing through the combustion heater is reintroduced into the duct in the passenger compartment, a combustion chamber disposed in said heat exchanger and in which fuel is combusted for generating hot gases, a combustion air intake passage open to and extending between the intake manifold at a first location therein and said combustion heater for allowing a portion of a gas flowing in an intake direction in the intake manifold to the engine to pass to said combustion chamber, a discharge passage open to and extending between the exhaust manifold of the engine and said combustion chamber for allowing the hot gases generated in said combustion chamber to pass to the atmosphere; and a temperature control door disposed in said duct at a location at which the intake passage of said combustion heater heat exchanger is connected to said duct, said temperature control door movable between a first position extending across said intake passage and a second position extending across said duct for controlling the amount of air traveling in said duct past said evaporator that is introduced to said heat exchanger.

* * * * *